United States Patent
Steinbeck et al.

(10) Patent No.: US 8,472,610 B1
(45) Date of Patent: *Jun. 25, 2013

(54) SYSTEMS, METHODS, AND COMPUTER-READABLE MEDIUM FOR TRACKING, RECONCILING, AND REPORTING ON DTMF DATA AND VOICE DATA COMMUNICATED BETWEEN CALL CENTERS AND USERS

(75) Inventors: Michelle L Steinbeck, Omaha, NE (US); Joel G Mason, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,544

(22) Filed: Jul. 22, 2011

Related U.S. Application Data

(63) Continuation of application No. 12/411,637, filed on Mar. 26, 2009, now Pat. No. 8,019,074, which is a continuation of application No. 10/607,504, filed on Jun. 26, 2003, now Pat. No. 7,529,362.

(51) Int. Cl.
 *H04M 3/00* (2006.01)
 *H04M 5/00* (2006.01)

(52) U.S. Cl.
 USPC ............... 379/265.02; 379/264; 379/265.01; 379/283

(58) Field of Classification Search
 USPC 379/265.02, 264, 265.01, 283, 339; 370/352, 370/354; 704/246
 See application file for complete search history.

(56) References Cited

U.S. PATENT DOCUMENTS

| | | | |
|---|---|---|---|
| 5,414,755 A | 5/1995 | Bahler | |
| 5,623,539 A | 4/1997 | Bassenyemukasa | |
| 5,940,476 A | 8/1999 | Morganstein | |
| 6,119,084 A | 9/2000 | Roberts et al. | |
| 7,088,804 B1* | 8/2006 | Kasturi et al. | 379/93.27 |

OTHER PUBLICATIONS

Voicelog, VoiceLog Announces Inbound That Delivers, Press Release, www.voicelog.com, Oct. 2, 2000.

* cited by examiner

*Primary Examiner* — Thjuan K Addy

(57) ABSTRACT

Systems, methods, and computer-readable media for tracking, reconciling, and reporting on data representing Dual Tone Multi-Frequency (DTMF) tones and voice signals communicated between call center and users during interactions therebetween. The system may include a data store adapted to store the DTMF data and a text corresponding to the voice data; a transcription process receiving data representing the voice signal and converting it into corresponding text; a report generation process obtaining the DTMF data and the text, transmitting a report containing the same to a client, and updating the date store accordingly; and a reconciliation process receiving data enabling reconciliation of data as tracked by the call center and as tracked by an entity other than the call center. The transcription process may operate as a third-party or an in-house entity relative to the at least one call center.

20 Claims, 6 Drawing Sheets

US 8,472,610 B1

SYSTEMS, METHODS, AND COMPUTER-READABLE MEDIUM FOR TRACKING, RECONCILING, AND REPORTING ON DTMF DATA AND VOICE DATA COMMUNICATED BETWEEN CALL CENTERS AND USERS

CROSS-REFERENCE TO RELATED APPLICATIONS

The present patent application is a continuation of and claims priority from patent application Ser. No. 12/411,637, filed on Mar. 26, 2006 and titled Systems, Methods, and Computer-Readable Medium for Tracking, Reconciling, and Reporting on DTMF Data and Voice Data Communicated Between Call Centers and Users which is a continuation of and claims priority from patent application Ser. No. 10/607,504, filed Jun. 26, 2003 and titled Systems, Methods, and Computer-Readable Medium for Tracking, Reconciling, and Reporting on DTMF Data and Voice Data Communicated Between Call Centers and Users, now issued U.S. Pat. No. 7,529,362, issued on May 5, 2009, the entire contents of each are enclosed by reference herein.

BACKGROUND OF THE INVENTION

The present invention is generally related to voice data communicated between call centers and users. More specifically, to systems, methods and computer-readable medium for tracking, reconciling, and reporting on data representing at least one Dual Tone Multi-Frequency (DTMF) tone and at least one voice signal that are communicated between at least one call center and at least one user.

BRIEF SUMMARY OF THE INVENTION

A first aspect of the invention may include an automated, computer-based system for tracking, reconciling, and reporting on data representing at least one Dual Tone Multi-Frequency (DTMF) tone and at least one voice signal. The at least one Dual Tone Multi-Frequency (DTMF) tone and at least one voice signal are communicated between at least one call center and at least one user during at least one interaction therebetween. The system comprises the following: at least one data store adapted to store at least first data representing the at least one DTMF tone; and at least one transcription process adapted to receive data representing the at least one voice signal and to convert it into corresponding text. The transcription process may operate as at least one of a third-party relative to the at least one call center and the at least one user, and an in-house entity relative to the at least one call center. There may be at least one report generation process adapted at least to obtain at least the first data and the corresponding text. The report process then transmits at least one report to at least one client. The report may contain at least the first data, the voice signal and the corresponding text. The report process then updates the at least one data store, wherein the data store allocates a space for and stores at least one of a plurality of records, in response to transmission of the report. At least one reconciliation process communicates with the at least one data store to receive data enabling reconciliation of data as tracked by the at least one call center. The call center may include a facility, for example, either an in-house facility or at a merchant location or an out-sourced facility to a third-party. The reconciliation process communicates with the at least one data store to receive data enabling reconciliation of data as tracked by the at least one call center, and as tracked by at least one entity other than the at least one call center, and is adapted to calculate and display reconciliation data at least to the at least one call center.

Another aspect of the invention may include an automated, computer-based method for tracking, reconciling, and reporting on data representing at least one Dual Tone Multi-Frequency (DTMF) tone and at least one voice signal that are communicated between at least one call center and at least one user during at least one interaction therebetween. The method may comprise capturing first data representing at least one DTMF tone generated during a first interaction; capturing at least second data representing at least one voice signal generated during the first interaction; transcribing the at least one voice signal into corresponding text, wherein the transcribing is performed as at least one of a third-party relative to the at least one call center and the at least one user, and an in-house entity relative to the at least one call center; creating at least one record to store the first and the at least second data and at least one of the voice signal and corresponding text; determining a completeness parameter associated with the at least one record; generating at least one report containing at least in part the at least one record; and transmitting the at least one report. An automated, computer-based method is provided for tracking, reconciling, and reporting on data representing at least one Dual Tone Multi-Frequency (DTMF) tone and at least one voice signal that are communicated between at least one call center and at least one user during at least one interaction therebetween. The method comprises capturing first data representing at least one DTMF tone generated during a first interaction between at least one call center and at least one user during at least one interaction. Once completed, second data representing at least one voice signal generated during the first interaction are captured and at least one record is created to store the first and the at least second data and the voice signal. After the record is generated, a completeness parameter associated with the record is determined and at least one report containing at least in part the at least one record is generated. Finally, the at least one report.

Yet another aspect of the invention may include a computer readable medium comprising instructions executable by computer to for track, reconcile, and report on data representing at least one Dual Tone Multi-Frequency (DTMF) tone and at least one voice signal that are communicated between at least one call center, and at least one user during at least one interaction therebetween. The instructions may be operable perform method steps of the invention.

BRIEF DESCRIPTIONS OF THE DRAWINGS

DETAILED DESCRIPTION OF THE INVENTION

Figure 1:
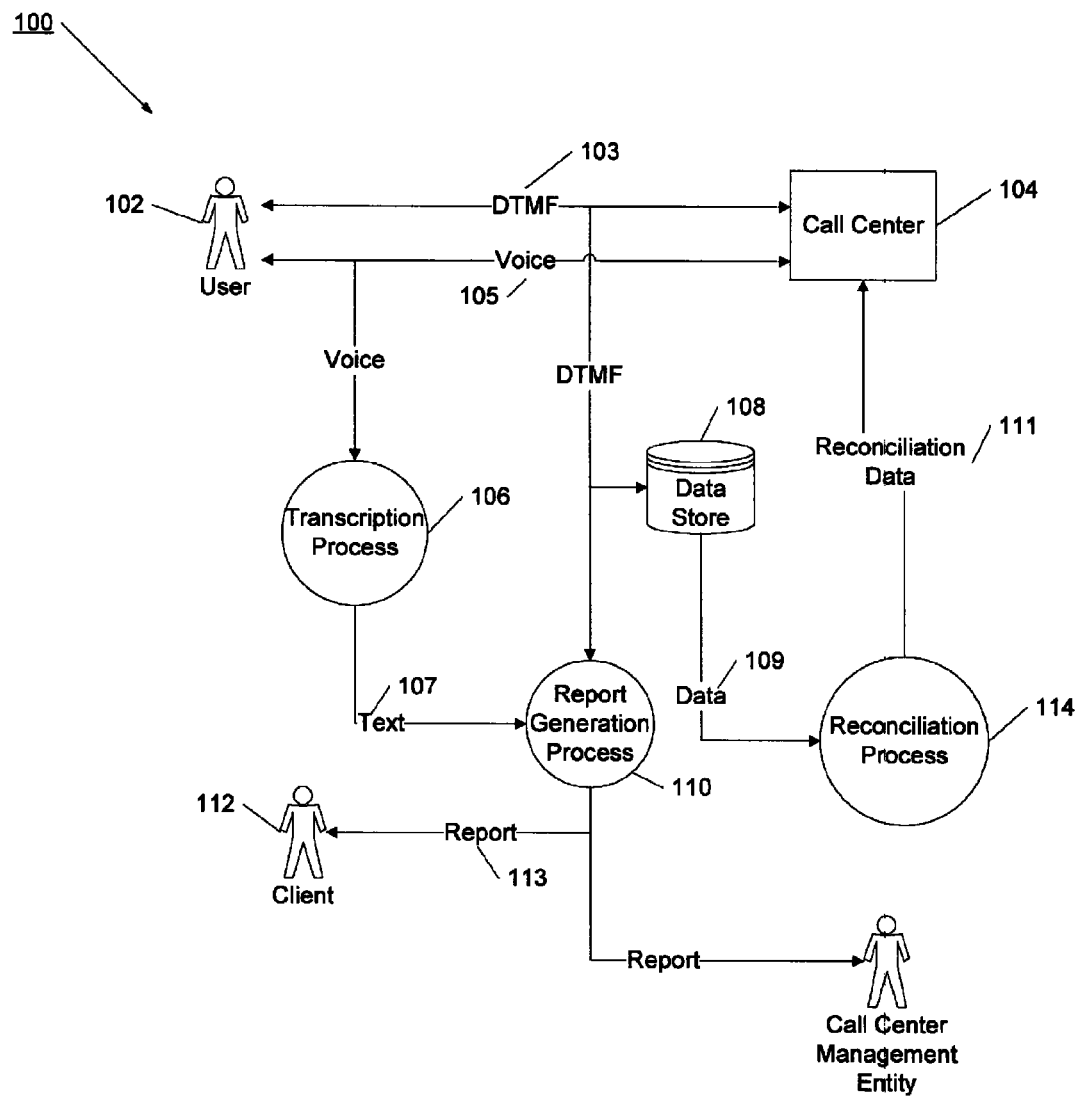
FIG. 1 is a block diagram illustrating various components and data flows related to a system provided according to various illustrative embodiments of the invention.

FIG. 1 is a block diagram illustrating various components and data flows related to a system 100 provided according to various illustrative embodiments of the invention. One aspect of the instant invention provides an automated, computer-based system 100 for tracking, reconciling, and reporting on data representing one or more dual-tone multi-frequency (DTMF) tones 103 and one or more voice signals 105 that are communicated between one or more call centers 104 and one or more users 102 during at least one interaction therebetween. As a definitional matter, the term "user" herein refers to persons who may either contact or be contacted by a call center 104. From the call center's perspective, the former case can be characterized as an inbound contact and the latter case as an outbound contact. The invention as disclosed and claimed herein may be applicable in either context. The term "call center" herein refers to any facility, either in-house at a given merchant or outsourced to a third party, wherein calls are received or placed. The term "interaction" refers to any contact conducted between the user 102 and the call center 104, most typically but not exclusively a telephone call originated by either the user 102 or the call center 104.

Data Stores

The system 100 can comprise one or more data stores 108 that are adapted to store, inter alia, data that represents the one or more DTMF tones 103 received from a given user 102 or users. Alternatively, several respective data stores, such as IVR master record storage 108a and voice record storage 108b shown in FIG. 2, can be provided to store data representing voice signals 105, DTMF tones 103, transcribed text 107, and other data as described herein, or at least some of this data can be combined for storage in the same data store 108.

The term "data store" herein refers to any storage medium capable of storing data, whether realized using semiconductor, magnetic, or optical technology. This term can also include abstract data structures supported by any number of programming languages, with non-limiting examples including queues, stacks, linked lists or the like, all of which are implemented at the machine level by disk storage, semiconductor memory, optical media, or the like. If the data store 108 is implemented as a database, this database can take the form of a relational database, an object-oriented database, and any combination thereof, or any other known database technology. Suitable database server programs are readily available from a variety of vendors, including IBM/Informix, Microsoft, Oracle, or the like.

Figure 4A:
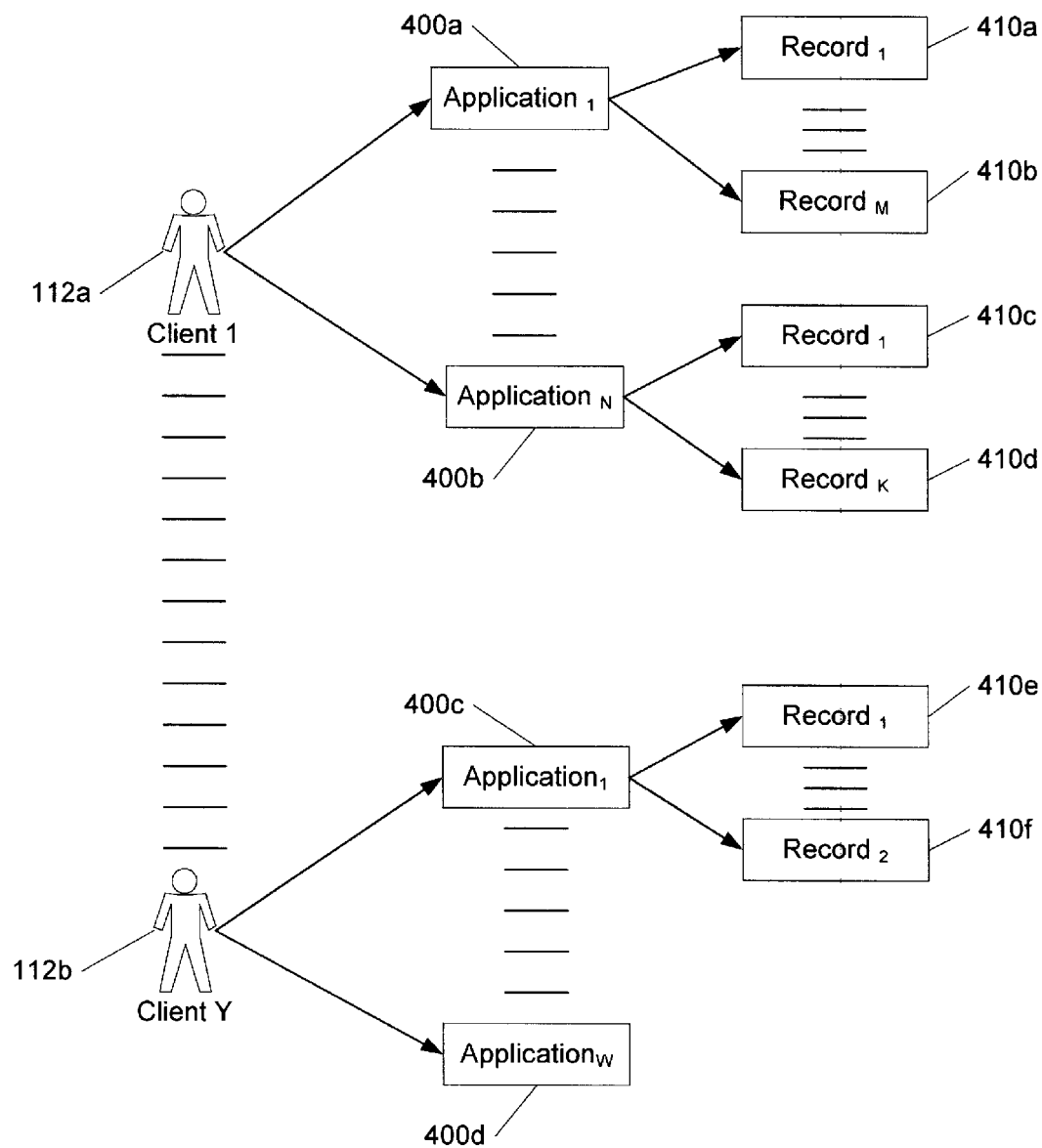
FIG. 4A is a block diagram illustrating relationships between clients, applications, and records provided according to various illustrative embodiments of the invention.
Figure 4B:
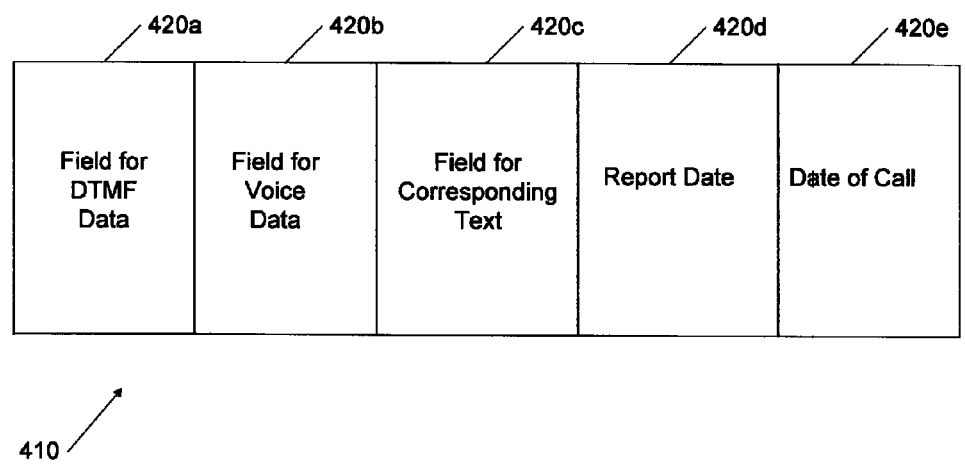
FIG. 4B is a diagram illustrating a data structure suitable for storing various data as collected and generated by various illustrative embodiments of the invention.

Turning to FIG. 4B, a diagram illustrating a data structure suitable for storing various data as collected and generated by various illustrative embodiments of the invention. The one or more data stores 108 can allocate space for and store one or more discrete records 410, each of which records 410 can contain respective fields 420a-f for at least some of the DTMF data (420a), the voice data (420b), text corresponding to the voice data (420c), reporting date (420e), or date of call (420d). Other fields can be provided to store data such as load dates, edit dates, or the like. As known in the database arts, a "record" refers to a group of related data items that can be processed as a discrete unit, while "fields" refer to individual storage locations defined within a given record.

Turning to FIG. 4A, a block diagram illustrating relationships between clients, applications, and records provided according to various illustrative embodiments of the invention. The data store 108 can host a plurality of respective records 410a-f that contain given instances of DTMF data, voice data, and/or text data corresponding to the voice data, as well as other data discussed below, which data are obtained from given users 102 by one or more call centers 104 while supporting one or more given applications 400a-d on behalf of one or more clients 112a and 112b. These various data can be stored within respective fields 420 allocated within a given record 410. These fields 420 may be associated with one another to reflect their status as having been captured during a given interaction between a user 102 and a call center 104, including, as a non-limiting example, the fields 420a containing DTMF data and fields 420c containing text data corresponding to voice signals 105 captured during the interaction. This association can result from the fields 420 being part of a given record 410 allocated for a given interaction, or can result from the fields 420 themselves being allocated separately from mass storage (such as a stack or heap) and then linked with other fields 420 for a given interaction or with a record 410 allocated for the given interaction. These various methods of association can be performed using pointers or index fields or files as well known in the art.

Transcription Process

Returning to FIG. 1, one or more transcription processes 106 can be adapted to receive data 105 representing the one or more voice signals, and to convert or transcribe them into corresponding text 107. In different embodiments of the invention, the transcription process or entity 106 can take different forms. The transcription process 106 can operate as a third-party relative to the call center 104 and the at least one user 102, or can operate as an in-house entity relative to the call center 104. The transcription process(es) 106 can be realized as an automated system that converts the voice signal 105 substantially without human intervention. In the context of this description, "substantially without human intervention" refers to a transcription process 106 wherein human interaction is possibly necessary to initiate the transcription process 106 and occasionally trouble-shoot or remedy malfunctions, but wherein the process itself functions automatically in the normal course without active human participation. Conventional speech recognition engines may be suitable for realizing the transcription process 106. In other embodiments, transcription is done by a transcription entity 106 such as a live operator, or by an automated system that at least assists a live operator in converting the voice signal 105 into text 107.

Turning to the transcription process 106 in more detail, this process can receive or be forwarded a plurality of voice signals 105 and convert the same into corresponding text 107. "Voice signals" in this context can correspond to the waveforms corresponding to one spoken word, multiple words, or parts of a single word, depending on the technology used to implement the transcription process 106.

The transcription process 106 may communicate with a load process (not shown) that is adapted to populate a data store record 410 or field 420 with the corresponding text 107 once this text 107 is available from the transcription process 106. A suitable but non-limiting example of a load process would be a suitably constructed LOAD statement as known in SQL or other database languages.

Report Generation Process

One or more report generation processes 110 can obtain at least data representing the one or more DTMF tones 103 and the corresponding text 107, and transmit one or more reports 113 containing at least the DTMF data 103 and the corresponding text 107 to one or more clients 112. The report generation process 110 can update the one or more data stores 108 (see link 203 in FIG. 2) to reflect which data have been reported or transmitted to the client 112.

One function of the report generation process 110 is to determine when a record 410 allocated for a given interaction is complete and can be reported to the corresponding client 112. In one embodiment, the client 112 for whom the interaction is performed may specify what constitutes a complete record 410 suitable for reporting. In the outsourced call center context, the call center 104 may assist a plurality of different clients to track and meet respective reporting requirements. Where the clients 112 are financial institutions, the clients 112 may be subject to regulatory requirements mandating that each interaction with users 102 be tracked, accounted-for, and dispositioned.

In other embodiments, the call center 104 itself may define what constitutes a complete record 410. In any event, the report generation process 110 would then compare a given record 410 to this specification to determine whether the record 410 is complete. As a non-limiting example, a given client 112 may require that all transaction records 410 reported to it must contain populated fields for at least DTMF data 103 and text 107 corresponding to the voice data 105 captured during the transaction. The report generation process 110 can check a given record 410 for completeness by traversing the record 410 and examining whether the required field or fields 420 in the record 410 are populated with data. The invention can also include error-checking data using pre-defined guidelines. In short, the report generation process 110 determines that each voice signal 105 required to be transcribed for a given interaction has been converted into corresponding text 107. Typically, the report generation process 110 determines that text 107 corresponding to a given voice signals 105 have been received from the transcription process 106.

Once the report generation process 110 determines that a given record 410 is ready to be reported, this process 110 extracts the contents of one or more fields 420 of the data store(s) 108 in response to respective reporting requirements established by one more given clients 112. Once the data are extracted from these fields 420, the contents thereof can be placed in intermediate or temporary storage if necessary during the report generation process. The report generation process 110 can also format the contents of these fields 420 into one or more reports 113 in response to respective formatting requirements specified by one or more respective clients 112.

In other embodiments of the invention, the report generation process 110 can extract data for and format reports 113 for transmission to call center management entities 114, whether such entities are live personnel, groups or teams, or automated processes that oversee operations of the call center 104. In such embodiments, the above teaching regarding extracting field contents, field requirements, reporting requirements, formatting requirements, or the like in the context of preparing reports 113 for clients 112 are equally applicable in the context of preparing management reports. These management reports can take the form of, for example, status or progress reports or can be identical to reports provided to the client 112.

Whether the reports 113 are provided to clients 112 or call center management 114, these reports 113 can be generated and delivered at any convenient time interval, or can track data gathered over such time interval. Non-limiting examples of such time intervals can include minute, hour, day, week, month, year, or other suitable unit of time. Further, these reports 113 can contain data reporting on any number of parameters. Non-limiting examples of such reports can include any of the following, with the numbers being reported as a grand total, a cumulative and/or partial total, or partial totals gathered over a given time interval:

a number of records 410 generated over a given time period, a number of records 410 generated while supporting at least one specific application 400 (FIG. 4A), a number of records 410 generated while supporting at least one specific client 112, accounting for one or more separate applications 400, a number of voice signals 105 or records 410 that are awaiting transcription, either total, to-date, or over some time period, and/or total number of voice signals 105 or records 410 awaiting transcription, with the report 113 being organized by application 400 and/or by client 112.

The report generation process 100 can also report on records 410 that are considered "incomplete", in that they are not yet fully populated with the data required by the client 112 for whom the record 410 is being maintained. For example, given reports 113 can list a number of voice signals 105 that are awaiting transcription into corresponding text 102, either as a total number or a number generated over a time interval as discussed above. Further, these reports 113 can be organized by the transcription entity 106 to which the voice signal (s) 105 is sent, and can also track the time elapsed since the voice signal(s) 105 was sent. By tracking this date, the call center 104 can identify problems with a given transcription entity 106 by isolating those transcription entities 106 with a backlog of pending requests. The call center 104 can then pursue follow-up actions with the transcription entity 106 such as retracting previously-submitted requests, demanding faster resolution of pending requests, escalating the matter with the transcription entity 106, or routing future requests to other transcription entities 106. In any event, this tracking feature enables the call center 104 to identify and resolve relatively minor issues with transcription before they become major issues that impact the call center's ability to service its clients 112 in the context of real-time transcription, the reporting parameters discussed above, such as frequency of reports, can be adjusted accordingly.

As further non-limiting examples of reporting on incomplete records, the report generation process 110 can report on a number of voice records 410 that are acknowledged as received by one or more transcription entities 106, whether total or over one of the above time periods. This report can be further organized by the client 112 for whom the record 410 was generated, or a specific client application for which the record 410 is generated.

The report generation process 110 can also report on "spoils", which are those voice signals 105 that are incompletely transcribed and cannot reasonably be completely transcribed for any one of a variety of reasons, such as a garbled or distorted voice signal 105, computer hardware/software malfunctions that corrupt the voice signal 105 or prevent a voice signal 105 from being created, transmission line noise or other communications network-related issues that affect the voice signal 105, or the like. As noted above, if the client 112 is subject to 100% reporting requirements, it may be necessary for the call center 104 to track and report on "spoiled" voice signal 105.

The comments above regarding the content, frequency, and types of reporting done for complete or incomplete records 410 apply equally in the context of reporting on spoiled voice records. Non-limiting examples of reports 113 can include reporting on voice records 410 that are incompletely transcribed and can report total number or be organized by relevant time period (second, minute, hour, day, week, month, year, etc.). These reports 113 can also be organized by application 400, by client 112, by transcription entity 106, and any combination of the foregoing, or by other organizations criteria.

The report generation process 110 can also report specifically on "good" voice signals 105, which are those voice signals 105 that can be or are substantially completely transcribed into corresponding text 107. "Substantially" in this context refers to a transcription capturing all of the substantive meaning conveyed in the voice signal 105, while excluding extraneous material such as line noise, coughing, non-substantive conversation ("um", "uh", etc.), or the like.

The comments above regarding the content, frequency, and types of reporting, done for complete or incomplete records 410 apply equally in the context of reporting on "good" voice signals 105. Non-limiting examples of reports 113 can include reporting on voice records 105 that are completely transcribed and can be organized at least by relevant time period (second, minute, hour, day, week, month, year, etc.). These reports can also be organized by application 400, by client 112, by transcription entity 106, and any combination of the foregoing, or by other organizational criteria. In addition, these reports 113 can include entries for total number of records 410 that are or have been sent to respective clients 112, can be further organized by any of the time periods above, by application 400 supported on behalf of one or more clients 112, by relevant transcription entity 106, or by other organizational criteria.

Having generated the data required to compile the report 410, the report generation process 110 can transmit or send one or more respective reports 113 to one or more respective clients 112 or to a call center management entity 114. These reports 113 can be transmitted to the clients 112 or call center management entities 114 using any suitable transmission or communication technology as selected by those skilled in the art. Where call centers 104 host more than one application 400 for a given client 112, these reports 113 can list data relating to each respective application 400 supported on behalf of the given client 112. The report generation process 110 can store a date and/or a time at which respective records 400 reported to the corresponding client 112 are, for example, in a field 420e shown in FIG. 4B. In this embodiment, one or more fields 420e in the data store 118 can be marked as having had their contents reported to the corresponding client 410, as well being marked with the date and/or time of such reporting.

Those skilled in the art will recognize that, in light of the teaching herein, the report generation process 110 can readily be implemented using query commands formulated using known database software.

Reconciliation Process

One or more reconciliation processes 114 can be adapted to communicate with the one or more data stores 118 to receive data enabling reconciliation of data as tracked by the call center(s) 104 and as tracked by one or more entities other than the call center. The reconciliation process(es) 114 can be adapted to calculate and display reconciliation data 111, as well as reports (represented by reference numeral 113) compiled from such data, to call center management and/or to clients. In general, the function of the reconciliation process 114 is to reconcile one or more parameters as tracked by one or more call centers 104 with corresponding parameters as tracked by a second entity other than the call center 104, or to ensure that a count of a general item equals a count of specific items constituting the general item. These second entities could be clients 112, transcription service providers 106, or the like. As discussed above in connection with the report generation process 110, these reconciliation reports 111 could provide total counts, cumulative counts, counts to-date, data gathered per unit time, or any other convenient method of reporting.

Non-limiting examples of the types of parameters that can be tracked and reconciled by the reconciliation process 114 can include any of the following:

a count of voice signals 105 sent to a given transcription process 106 versus a count of corresponding text records 107 received from the transcription process 106. This difference should reveal how many records are "pending" or in "queue" at the transcription process 106. If this difference exceeds a given threshold, this may indicate a problem with the transcription process 106.

a count of records sent to a transcription process 106 versus a count of records acknowledged as received by the transcription process 106. Any difference between these counts could indicate a problem with the transcription process 106, or with the communication link between the call center 104 and the transcription process 106.

a status of each of interaction conducted by the call center 104. As a non-limiting example, this report 111 could categorize each voice signal 105 received by the at least one call center 104 as at least one of the following: a complete record 410 that has all required fields populated, an incomplete record 410 that does not yet have all required fields populated. For each field 420 within the record 410, the report 111 can characterize such fields 420 as containing a good transcription, and a failed transcription (or "spoil").

counts of records 410 created by the call center 104 versus counts of records 410 reported by the call center 104 to a given client 112. A difference in these counts indicates how many records 410 are "pending" or in "queue" at the call center 104, and a significant increase in this difference could indicate potential problems with call center processing. In turn, these problems could be traceable to issues with transcription, or problems with a communication link between the call center 104 and given client 112. For a call center management entity 114 that oversees multiple call centers 104, an increasing backlog or queue at a given call center 104 may indicate a need to follow-up with that specific call center 104 to avoid alienating clients 112. The invention can include reporting on such backlogs, or other matters described herein, in real-time with the occurrence of the detection of the backlog, and preferably in real-time with the occurrence of the circumstances causing the backlog. "Real-time" as used herein refers to a second event occurring without perceived delay after a first event.

Merge Process

Figure 3:
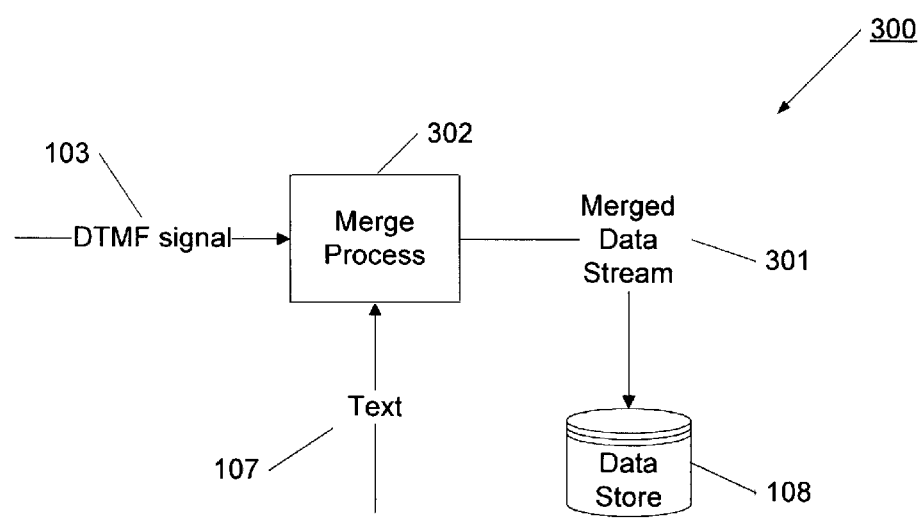
FIG. 3 is a block diagram illustrating data flow associated with a merge process provided according to various illustrative embodiments of the invention; \

FIG. 3 is a block diagram illustrating data flow associated with a merge process provided according to various illustrative embodiments of the invention. One or more merge processes 302 can match the DTMF tones 103 captured during a given interaction with text 107 corresponding to the at least one voice signal 105 captured during the given interaction. The merge process 302 can associate a DTMF tone 103 captured during a given interaction with text corresponding to at least one voice signal 105 captured during the given interaction, or can create one or more merged data streams 301 that include records 410 containing, for a given interaction, data representing DTMF tone(s) 103 and text 107 corresponding to voice signals 105 captured during that interaction, as well as the voice signals 105 themselves in some embodiments.

Voice Response Unit

Figure 2:
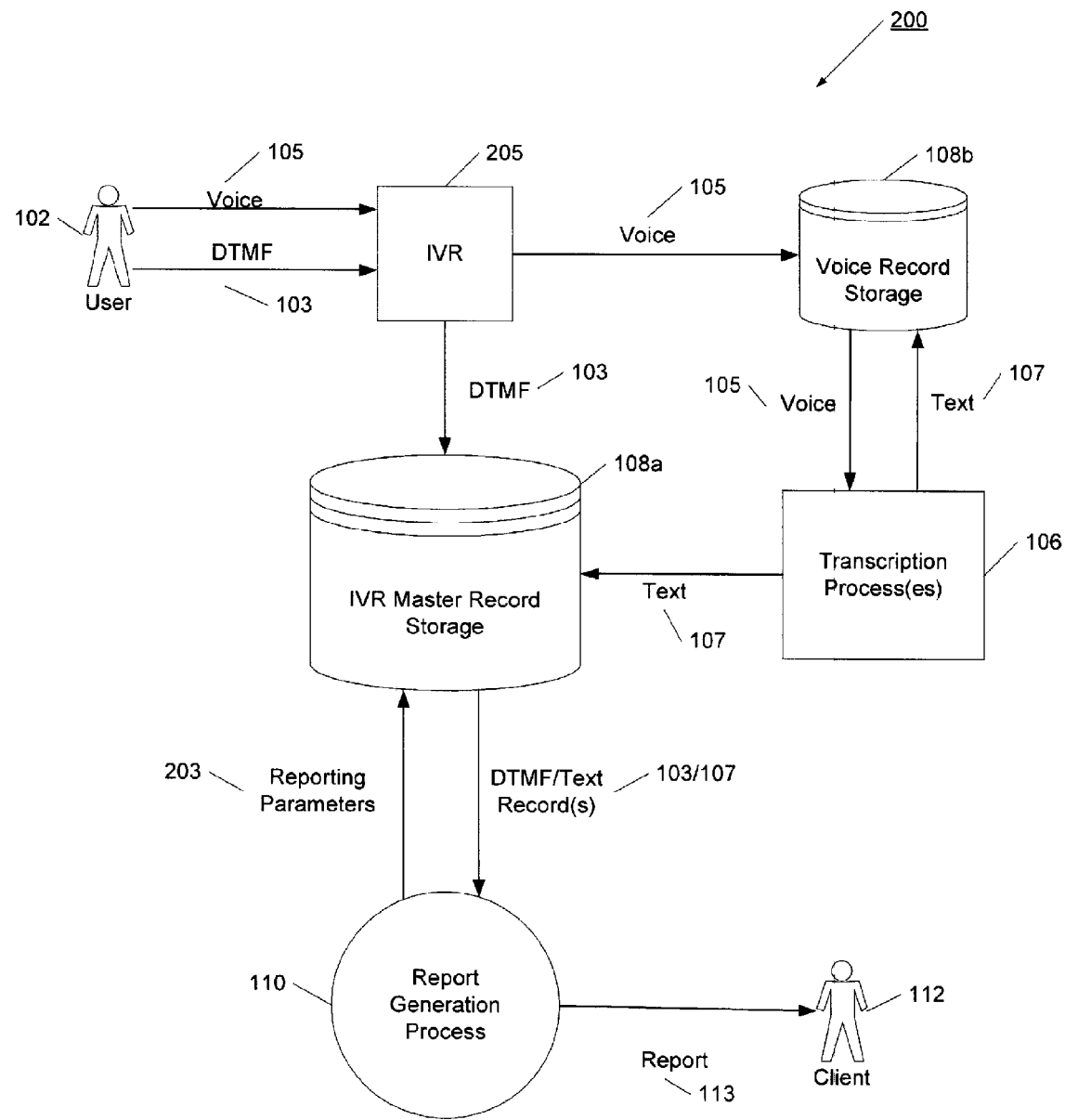
FIG. 2 is a block diagram illustrating various components and data flows related to a system provided according to various further illustrative embodiments of the invention.

FIG. 2 is a block diagram illustrating various components and data flows related to a system provided according to various further illustrative embodiments of the invention. A system 200 provided according to alternative embodiments of the invention can include a voice response unit (VRU) 205 adapted to capture data representing one or more DTMF tones 103 from a given user 102 interacting with the call center 104, or a plurality of respective DTMF tones 103 obtained from a plurality of such users 102. VRUs are also referred to in the industry as interactive voice response (IVR) units.

The voice response unit 205 can support multiple call center applications 400 on behalf of multiple call center clients 112 by capturing respective data representing a plurality of DTMF tones 103 or voice signals 105 from a plurality of users 102, wherein respective users 102 are calling for different respective programs or applications 400 that are supported on behalf of different clients 112 by one or more call centers 104. In the multiple call center context, the various call center facilities may or may not be affiliated with one another.

Figure 5:
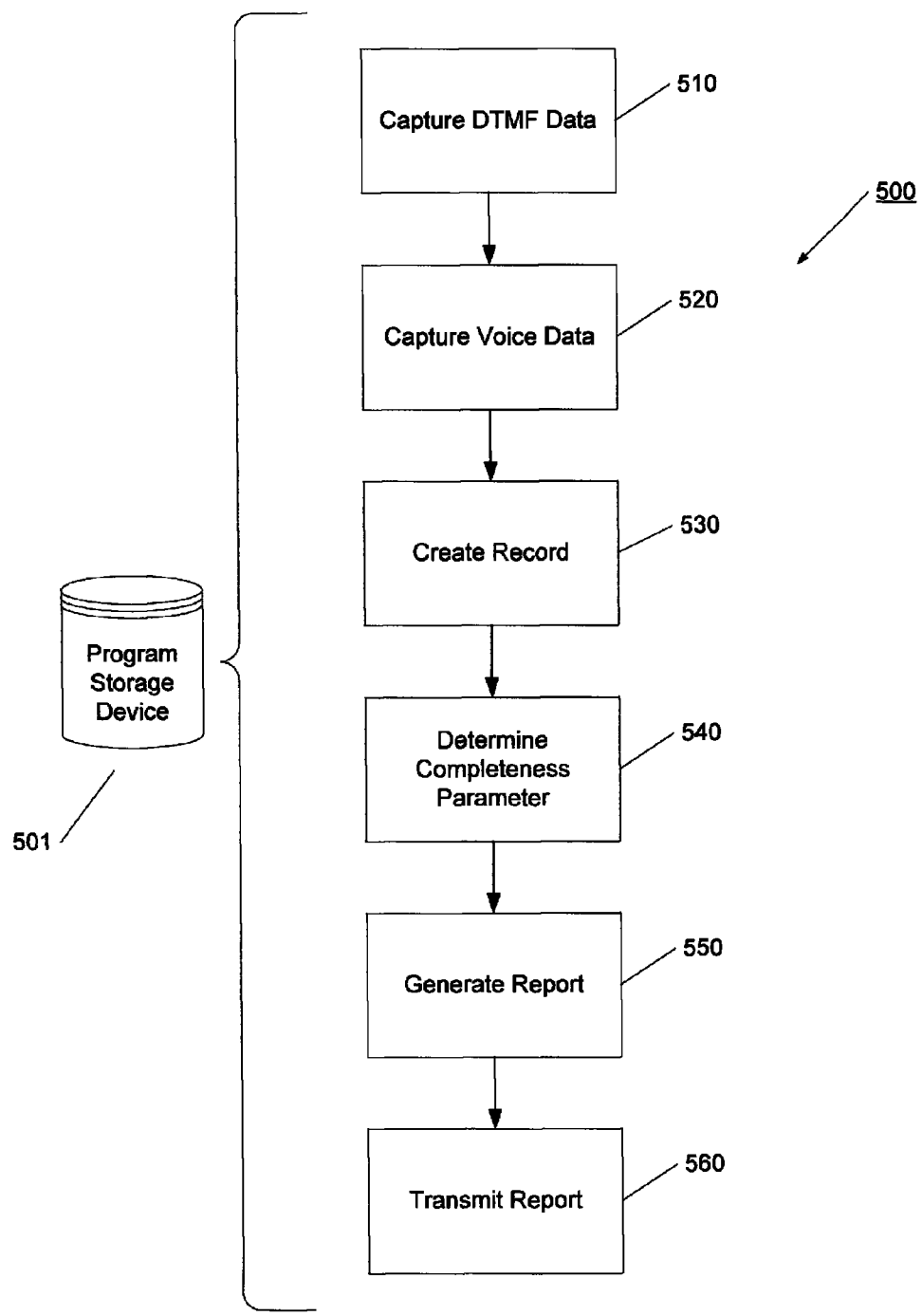
FIG. 5 is a flowchart illustrating process flow provided according to various illustrative embodiments of the invention.

FIG. 5 is a flowchart illustrating process flow provided according to various illustrative embodiments of the invention. The invention also provides methods for tracking, reconciling, and reporting on data that is generated during interactions between one or more call centers and one or more users contacting the call center. An illustrative method 500 can be conducted in connection with the above-discussed system components or with other systems or components, and can comprise at least the following. In block 510, data is captured that represents one or more DTMF tones 103 generated during a given interaction between a user 102 and a call center 104. In block 520, data is captured that represents one or more voice signals 105 generated during the given interaction. In block 530, one or more records 420 are created to store the DTMF data 103 and the voice data 105. In block 540, a completeness parameter indicating whether the one or more records 420 are complete is established. In block 550, one or more reports 113 are generated that contain at least in part the one or more records 420. The one or more reports 112 are finally transmitted to one or more recipients. Non-limiting examples of such recipients can include one or more clients 112 serviced by a call center 104 or one or more management entities 114 associated with the call center 104.

The specification above describes numerous variations of the above general method in the context of the system components discussed therein. Those skilled in the art will understand that these method steps could be practiced using either the system components disclosed above, or could be practiced independently of those system components, as contemplated in the method claims attached hereto.

Those skilled in the art will recognize that the format content, and layout of the data structures and flowcharts as shown herein are shown only for convenience, clarity, and conciseness in describing illustrative embodiments of the invention. Those skilled in the art will also recognize that the invention is not limited to the data structure and flowcharts as shown herein, but instead that the arrangement, layout, format, order and content of such flowcharts and data structures could be altered, for example by adding, modifying, or deleting fields from data structures, by adding processing, or the like without departing from the scope of the invention.

A suitable application program can implement software residing on the computer-readable medium or media 501 (FIG. 5) and embodying the various aspects of the method discussed herein and shown in the drawing figures, and can be coded using any suitable programming, database access, or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like.

As those skilled in the art will understand, the program of instructions can be loaded and stored onto a program storage medium or device 501 readable by a computer or other machine, embodying a program of instructions executable by the machine to perform the various aspects of the invention as discussed and claimed herein, and as illustrated in the drawing figures. Generally speaking, the program storage medium 501 can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 501 can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

What is claimed is:

1. An system, comprising:
at least one data store adapted to store at least first data representing the at least one DTMF tone;
at least one transcription process adapted to receive data representing the at least one voice signal and to convert it into corresponding text;
at least one report generation process adapted at least to:
obtain at least the first data and the corresponding text, and
transmit at least one report to at least one client, the report containing at least the first data, the at least one voice signal and the corresponding text; and at least one reconciliation process communicating with the at least one data store to receive data enabling reconciliation of data as tracked by at least one entity, and as tracked by at least one other entity, and being adapted to calculate and display the reconciliation data at least to the at least one call center.

2. The system of claim 1, further comprising at least one merge process adapted to match the at least one DTMF tone captured during a given interaction with text corresponding to the at least one voice signal captured during the given interaction.

3. The system of claim 2, wherein the at least one merge process is adapted to associate the at least one DTMF tone captured during the given interaction with text corresponding to the at least one voice signal captured during the given interaction.

4. The system of claim 2, wherein the merge process is adapted to create at least one merged data stream and includes data representing at least the at least one DTMF tone and the corresponding text.

5. The system of claim 2, wherein the merge process is adapted to create a merged
data stream that contains data representing at least the at least one DTMF tone captured during the given interaction and data representing the at least one voice signal captured during the given interaction.

6. The system of claim 1, further comprising at least a second data store adapted to store at least one of the first data and the corresponding text.

7. The system of claim 1, further comprising at least one further transcription process
adapted to convert data representing at least a further voice signal into corresponding text.

8. The system of claim 1, wherein the at least one transcription process is an automated system that converts the data representing the at least one voice signal substantially without human intervention.

9. A method, comprising:
capturing first data representing at least one DTMF tone generated during a first interaction;
capturing at least second data representing at least one voice signal generated during the first interaction;
transcribing the at least one voice signal into corresponding text;
creating at least one record to store the first and the at least second data and at least one of the voice signal and corresponding text; and
generating at least one report containing at least in part the at least one record.

10. The method of claim 9, comprising transmitting the at least one report wherein transmitting includes at least one of transmitting the at least one report to a client of the call center and transmitting the at least one report to at least one call center management entity.

11. The method of claim 9, wherein capturing first data includes at least one of capturing a plurality of DTMF tones from a given user interacting with the at least one call center and capturing at least one DTMF tone from a plurality of users interacting with the at least one call center.

12. The method of claim 9, wherein capturing first data includes at least one of capturing a plurality of DTMF tones from a plurality of users interacting with the at least one call center and capturing the plurality of DTMF tones from the plurality of users interacting with the at least one call center, at least two of which users are interacting with two respective programs that are supported by the at least one call center on behalf of different clients of the at least one call center.

13. The method of claim 9, wherein capturing first data includes capturing a plurality of DTMF tones from a plurality of users interacting with a plurality of call centers, at least two of which users are interacting with two respective programs that are supported by respective ones of the plurality of call centers on behalf of different clients of the plurality of call centers.

14. The method of claim 9, wherein capturing at least second data includes capturing at least one of a plurality of voice records from at least one user and capturing at least one voice record from a plurality of users.

15. The method of claim 9, wherein capturing at least second data includes at least one of capturing a plurality of voice records from a plurality of users and capturing at least one respective voice record from the plurality of users, at least two of which users are interacting with two respective programs that are supported by the at least one call center on behalf of different clients of the at least one call center.

16. The method of claim 9, wherein creating at least one record includes allocating space for the at least one record in at least one of a data store and an object-oriented database.

17. A non-transitory computer readable medium comprising instructions:
capturing first data representing at least one DTMF tone generated during a first interaction;
capturing at least second data representing at least one voice signal generated during the first interaction;
transcribing the at least one voice signal into corresponding text;
creating at least one record to store the first and the at least second data and at least one of the voice signal and corresponding text; and
generating at least one report containing at least in part the at least one record.

18. The computer readable medium of claim 17, wherein capturing first data includes at least one of capturing a plurality of DTMF tones from a given user interacting with the at least one call center and capturing at least one DTMF tone from a plurality of users interacting with the at least one call center.

19. The computer readable medium of claim 17, wherein capturing first data includes at least one of capturing a plurality of DTMF tones from a plurality of users interacting with the at least one call center and capturing the plurality of DTMF tones from the plurality of users interacting with the at least one call center, at least two of which users are interacting with two respective programs that are supported by the at least one call center on behalf of different clients of the at least one call center.

20. The computer readable medium of claim 17, wherein capturing first data includes capturing a plurality of DTMF tones from a plurality of users interacting with a plurality of call centers, at least two of which users are interacting with two respective programs that are supported by respective ones of the plurality of call centers on behalf of different clients of the plurality of call centers.

* * * * *